3,759,809
RADIATION-CURABLE COMPOSITIONS COMPRISING AN ISOCYANATE-MODIFIED POLYFUNCTIONAL ESTER AND A PHOTOINITIATOR
Daniel J. Carlick, Northbrook, Ill., Frank Marra, Wayne, N.J., and Gerhard E. Sprenger, North Stonington, Conn., assignors to Sun Chemical Corporation, New York, N.Y.
No Drawing. Continuation-in-part of application Ser. No. 244,910, Apr. 17, 1972, which is a continuation-in-part of application Ser. No. 850,633, Aug. 15, 1969, both now abandoned. This application Nov. 14, 1972, Ser. No. 306,435
Int. Cl. C08d 1/00; C08f 1/16
U.S. Cl. 204—159.23                    10 Claims

ABSTRACT OF THE DISCLOSURE

A radiation-curable composition comprises at least one isocyanate-modified polyfunctional ester having a hydroxyl value of about 15–70 and at least one photoinitiator.

---

This application is a continuation-in-part of copending application Ser. No. 244,910, filed Apr. 17, 1972, now abandoned, which is a continuation-in-part of application Ser. No. 850,633, filed Aug. 15, 1969, now abandoned.

This invention relates to radiation-curable compositions. More specifically it relates to radiation-curable compositions having reduced water-sensitivity and reduced toxicity.

The use of radiation-curable ethylenically unsaturated monomeric materials in coating compositions, adhesives, printing inks, and the like is known. It is also known that such monomeric materials are converted into polymers by the action of radiation and that they will polymerize at an improved rate when they are exposed to actinic radiation in the presence of a photoinitiator, as disclosed in, for example, U.S. Pats. 3,551,235; 3,551,246; 3,551,311; and 3,558,387.

The use of some of these materials, however, is somewhat limited by their strong affinity for water. When, for example, the compositions were formulated into printing inks for lithography, they absorbed excessive amounts of fountain solutions, resulting in emulsification, tinting, weak printing, and poor water-ink control. When used as adhesives the bonding properties often were poor due to absorbed atmospheric moisture; in coatings for paper they lacked gloss and smoothness and they cured at a slower rate than when in a dry condition. The reason for this water-sensitivity is not now fully understood, but it is believed to be due, at least in part, to the presence of hydroxyl groups.

It has now been found that the hydrophobicity of these compositions can be regulated as desired by modifying with an isocyanate the base monomeric material of the composition. As used hereinafter, unless otherwise specified "monomeric material" means both monomers and prepolymers, that is, dimers, trimers, and other oligomers and mixtures and copolymers thereof. The resulting isocyanate-modified material has decreased water-sensitivity without loss in radiation-susceptibility or adverse effect on its other properties, e.g., gloss, printability, smoothness, adhesion, and so forth.

Inks and coatings made from the compositions of the present invention are free of volatile solvents, hydrophobic, and upon exposure to a source of radiation dry almost instantaneously in air at ambient temperature, thus eliminating the need for ovens and the need to work in an oxygen-free environment as well as avoiding air pollution, fire hazards, odor, and so forth, that accompany the use of coating, ink, and adhesive systems based on volatile solvents. The inks have excellent workability on offset printing presses. The inks and coatings form extremely hard and durable films on a wide variety of substrates, such as, for example, newsprint; coated paper stock; irregular, e.g., corrugated, board; metal, e.g., foils, meshes, cans, and bottle caps; woods; rubbers; polyesters, such as polyethylene terephthalate; glass; polyolefins, such as treated and untreated polyethylene and polypropylene; cellulose acetate; fabrics such as cotton, silk, and rayon; and the like. They exhibit no color change in the applied film when subjected to the required curing conditions, and they are resistant to flaking; smudging; salt spray; scuffing; rubbing; and the deteriorating effects of such substances as alcohols, oils, and fats. In addition, the compositions of this invention withstand both heat and cold, making them useful, for example, in printing inks or coatings for containers that must be sterilized, e.g., up to about 150° C. under pressure, and/or refrigerated, e.g., at less than about −20° C.

In addition, the toxicological properties of some radiation-curable compounds can be improved by modifying them with isocyanates. The reduction in the hydroxy functionality and the increase in the molecular weight of the products when certain polyethylenically unsaturated esters are modified with isocyanates substantially reduce the health hazards frequently encountered in the manufacture and use of the base monomeric esters.

In general the compositions of this invention comprise (a) at least one radiation-curable isocyanate-modified polyethylenically unsaturated ester having a controlled hydroxyl content and (b) at least one photoinitiator along with, if desired, (c) at least one colorant. Also within the scope of this invention are compositions which comprise (a) at least one isocyanate-modified polyethylenically unsaturated ester with controlled hydroxyl content, (b) at least one unmodified polyethylenically unsaturated ester with free hydroxyl groups which is different from the starting ester of (a), and (c) at least one photoinitiator with or without (d) at least one colorant.

Suitable starting compounds for use in the compositions of this invention are polyfunctional ethylenically unsaturated monomers and prepolymers, e.g., dimers, trimers, and other oligomers, and mixtures and copolymers thereof having a finite free hydroxyl content. As employed herein, the term "polyethylenically unsaturated" refers to compounds having two or more pendant ethylenic groups. The monomers or prepolymers may be generally described as the acrylic acid, methacrylic acid, itaconic acid, and the like, esters of aliphatic polyhydric alcohols, such as for example the di- and polyacrylates, the di- and polymethacrylates, and the di- and polyitaconates of alkylene glycols, alkoxylene glycols, alicyclic glycols, and higher polyols, such as ethylene glycol, triethylene glycol, tetraethylene glycol, tetramethylene glycol, trimethylolethane, trimethylolpropane, pentaerythritol, dipentaerythritol, tripentaerythritol, and the like, or mixtures of these with each other or with their partially esterified analogs, and their prepolymers, said compound or mixture having free hydroxyl content.

Typical compounds include, but are not limited to trimethylolpropane triacrylate, trimethylolethane triacrylate, trimethylolpropane trimethacrylate, trimethylolethane trimethacrylate, tetramethylene glycol dimethacrylate, ethylene glycol dimethacrylate, triethylene glycol dimethacrylate, tetraethylene glycol diacrylate, tetraethylene glycol dimethacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerytritol pentaacrylate; dipentaerythritol hexacrylate, tripentaerythritol octoacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, and the like, and the mixtures and prepolymers thereof, mixtures of dimers and trimers of tripentaerythritol octoacrylate, mixtures of dimers and trimers of dipentaerythritol hexacrylate, and the like, and mixtures thereof, wherein a low but finite hydroxyl content must exist.

The successful use of these esters in, for example, lithographic inks depends on the hydrophilic/hydrophobic balance of the molecule, i.e., the solubility of the monomer in water and the solubility of water in the monomer. In order to control the hydrophilicity of these monomers and prepolymers, the molecule is chemically modified with an isocyanate, producing a product which exhibits the desired hydrophilic/hydrophobic balance. It is essential, therefore, that the starting esters have some free hydroxyl groups in order to react with the —NCO group of the isocyanates. Thus, for example, in preparing trimethylolpropane trimethacrylate the esterification reaction is not carried to completion, leaving unreacted hydroxyl groups in the monomeric material.

The above-described esters may be obtained in any convenient manner, such as for example by the ester interchange method of interacting a lower alkyl ester of the acid with the alcohol in the presence of a suitable catalyst or by the reaction of the alcohol with the $\alpha,\beta$-unsaturated acids or acyl chlorides in the presence of suitable acid scavengers.

The monomer, prepolymer, or mixture thereof is reacted with an isocyanate to yield a compound that has increased hydrophobic properties and thus improved water-resistance, gloss, bonding qualities, smoothness, and so forth, as well as lower toxicity. The isocyanate-modified ester is conveniently prepared by reacting the monomeric ester with an isocyanate under controlled conditions. In general the reaction is carried out within the range of about 25° to 100° C., and preferably at about 50° C.

While it is possible to convert all of the hydroxyl groups of the starting ester to carbamate groups, for the applications for which the products of this invention are most appropriate, i.e., inks, coating compositions, adhesives, and the like, it is essential not to convert all of the hydroxyl groups, that is, to leave in the composition some isocyanate-modified ester having free hydroxyl content. The complete consumption of hydroxyl groups causes an undesirable condition known in the art of lithography as "ink stripping," that is, the phenomenon wherein the ink does not pick up enough water to print satisfactorily. The isocyanate-modified ester products should have a hydroxyl number of about 15 to 70 and preferably about 25 to 60. "Hydroxyl number" is defined by ASTM specification D–2849–69 as the milligrams of potassium hydroxide equivalent to the hydroxyl content of one gram of the sample.

The amount of isocyanate that must be reacted with the ester to obtain a product having optimum properties varies with the selected monomeric ester, with the selected isocyanate, and with the properties that are required for the intended end use. For example, for a phenyl isocyanate-modified pentaerythritol triacrylate to be used in a lithographic ink the conversion is preferably not more than about 60 percent of the hydroxyl content; this provides good lithographing properties with good storage stability.

In addition, the ratio of the —NCO groups to the —OH groups is important; this also varies with the specific monomer and isocyanate selected. When, for example, the ester is a pentaerythritol-3.5-acrylate, that is, a mixture of approximately 50 mole percent of the triacrylate and 50 mole percent of the tetraacrylate, the ratio of the —NCO groups to the original —OH groups is generally within the range of about 0.2 to 0.8, and preferably the ratio is about 0.6, leaving about 0.4 of the original —OH groups unreacted.

Any of a wide variety of suitable organic isocyanates may be used, including aliphatic, cycloaliphatic, heterocyclic, and aromatic mono- and polyisocyanates, and combinations of these. Examples include, but are not limited to, 6-ethyldecyl isocyanate, octadecyl isocyanate, phenyl isocyanate, chlorophenyl isocyanate, stearyl isocyanate, cyclohexyl isocyanate, 6-phenyldecyl isocyanate, 6-cyclohexyldodecyl isocyanate, 2,4-tolylene diisocyanate, 2,6-tolylene diisocyanate, 1,4-phenylene diisocyanate, hexamethylene diisocyanate, 1,4-naphthalene diisocyanate, 1,5-naphthalene diisocyanate, 4,4¹-diphenylmethane diisocyanate, p,p¹-diphenyl diisocyanate, butylene-1,4-diisocyanate, ethylene diisocyanate, trimethylene diisocyanate, tetramethylene - 1,4 - diisocyanate, butylene-2,3-diisocyanate, cyclohexylene-1,2-diisocyanate, methylene-bis (4-phenylisocyanate), diphenyl - 3,3¹ - dimethyl-4,4¹-diisocyanate, xylylene diisocyanate, cyclohexane-1,4-diisocyanate, 1-methoxyphenyl-2,4-diisocyanate, benzene-1,2,4-triisocyanate, polymethylene polyphenylisocyanate, toluene-2,4,6-triisocyanate, 4,4'-dimethyldiphenyl methane-2,2',5,5'-tetraisocyanate, and the like, and mixtures thereof.

The isocyanate reacts with the ethylenically unsaturated hydroxyl material to give the carbamate reaction product, thus reducing the free hydroxyl content of the starting ester and so reducing its water sensitivity and its toxicity. This increase in hydrophobicity has made the products more suitable for use as lithographic inks, adhesives, coating compositions, etc., without loss in stability and with, in some instances, increased speed of curing.

Suitable photoinitiators for the compositions of this invention include, but are not limited to, the following: acyloins; acyloin derivatives, such as benzoin methyl ether, benzoin ethyl ether, desyl bromide, desyl chloride, desyl amine, and the like; ketones, such as benzophenone, acetophenone, ethyl methyl ketone, cyclopentanone, benzil, caprone, benzoyl cyclobutanone, dioctyl acetone, and the like; substituted benzophenones, such as N,N-dimethylamino benzophenone, Michlers' Ketone, and halogenated aceto- and benzophenones; polynuclear quinones, such as benzoquinone and anthraquinone; substituted polynuclear quinones, such as chloroanthraquinone, methylanthraquinone, octamethylanthraquinone, napthoquinone, dichloronaphthoquinone, and so forth; halogenated aliphatic, alicyclic, and aromatic hydrocarbons and their mixtures in which the halogen may be chlorine, bromine, fluorine, or iodine, such as for example chlorinated rubbers such as the Parlons (Hercules Inc.), copolymers of vinyl chloride and vinyl isobutyl ether such as Vinoflex MP-400 (BASF Colors and Chemicals, Inc.), chlorinated aliphatic waxes such as Chlorowax 70 (Diamond Alkali, Inc.), perchloropentacyclodecane such as Dechlorane+ (Hooker Chemical Co.), chlorinated paraffins such as Chlorafin 40 (Hooker Chemical Co.) and Unichlor-70B (Neville Chemical Co.), mono- and polychlorobenzenes; mono- and polybromobenzenes, mono- and polychloroxylenes, mono- and polybromoxylenes, dichloromaleic anhydride, 1-(chloro-2-methyl) naphthalene, 2,4-dimethylbenzene sulfonyl chloride, 1-bromo-3-(m-phenoxyphenoxy) benzene, 2-bromoethyl methyl ether, chlorendic anhydride and its corresponding esters, chloromethylnaphthyl chloride, chloromethyl naphthalene, bromomethyl phenanthrene, diiodomethyl anthracene, hexachlorocyclopentadiene, hexachlorobenzene, and the like; and mixtures thereof.

The radiation-curable composition may also include, if desired, about 0.1 to 2.0 percent, based on the weight of the total composition, of an accelerating agent, such as the mercaptans and their derivatives, for example, ethyl mercaptoacetate; amine oxides, such as bis (2-hydroxyethyl) cocoamine oxide and bis(2-hydroxyethyl) octadecylamine oxide; cyclized unsaturated aromatic hydrocarbons, e.g., neohexene, cyclohexene, cyclooctene, and d- limonene; and the like; and mixtures thereof. The above described additives may further be used in varying mixtures. The modified radiation-curable esters may be additionally modified if desired, by the addition of a prepolymer, such as a diallyl phthalate prepolymer, and a chain transfer agent; a prepolymer and an unsaturated compound reactive with oxygen, e.g., an alkyd resin; a prepolymer and a further modifying substance, e.g., cetyl vinyl ether; a viscosity control agent together with a chain transfer agent, a prepolymer or other modifying resin; and mixtures thereof.

The ratio of the amount of the isocyanate-modified monomeric ester to the photoinitiator in the composition may range from about 99:1 to about 10:90, and preferably from about 98:2 to about 70:30.

Conventional colorants may be used in conventional quantities in the compositions of this invention. Suitable pigments include carbon black, zinc oxide, titanium dioxide, phthalocyanine blue, phthalocyanine green, benzidine yellow, naphthol yellow lake, cadmium orange, cadmium yellow, chrome yellow, Prussian blue, bronze blue, chrome green, peacock blue lake, milori blue, ultramarine blue, red lake C, para red toluidine red, sodium lithol red, barium lithol red, lithol rubine, molybdated scarlet chrome, ferric oxide, aluminum hydrate, and the like. The vehicle may be used in an amount ranging from about 20 to 99.9 percent of the weight of the total composition and the amount of colorant may range from about 0.1 to 80 percent of the weight of the total composition.

Other commonly known modifiers may be incorporated into the formulations using the compositions of the present invention. These include plasticizers; wetting agents for the colorant, such as dichloromethylstearate and other chlorinated fatty esters; leveling agents, such as lanoline, paraffin waxes, and natural waxes; and the like. Such modifiers are generally used in amounts ranging up to 3, and preferably about 1 percent, based on the total weight of the formulation.

The formulations using the compositions of this invention may be prepared in any convenient manner, such as, for example, in a three-roll mill, a sand mill, a ball mill, a colloid mill, or the like, in accordance with known dispersion techniques.

Variables which determine the rate at which a radiation-curable composition will dry include the nature of the substrate, the specific ingredients in the composition, the concentration of of the photoinitiator, the thickness of the material, the nature and intensity of the radiation source and its distance from the material, the presence or absence of oxygen, and the temperature of the surrounding atmosphere. Irradiation of the compositions may be accomplished by any one or a combination of a variety of methods. The composition may be exposed, for example, to actinic light from any source and of any type as long as it furnishes an effective amount of ultraviolet radiation, since the compositions of this invention activatable by actinic light generally exhibit their maximum sensitivity in the range of about 1800 A. to 4000 A. and preferably about 2000 A. to 3500 A.; electron beams; gamma radiation emitters; and the like; and combinations of these. Suitable sources include, but are not limited to, carbon arcs, mercury-vapor arcs, Van der Graaff accelerators, Resonant transformers, Betatrons, linear accelerators, and so forth.

The time of irradiation must be sufficient to give the effective dosage. Irradiation may be carried out at any convenient temperature, and most suitably is carried out at room temperature for practical reasons. Distances of the radiation source from the work may range from about ⅛ to 10 inches, and preferably from about ⅛ to 3 inches.

Inks, coating compositions, adhesives, and the like made from the compositions of this invention possess many advantages over the conventional solvent-type inks, coatings, adhesives, etc. In the first place, the use of volatile solvents and the attendant hazards and odor are eliminated. The inks, coatings, and adhesives have excellent adhesion to the substrate after exposure to radiation. They have good gloss and rub-resistance and withstand temperatures as high as 150° C. and as low as −20° C. The printed or coated sheets can be worked and turned immediately after exposure to the energy source.

In order to determine the lithographic efficiency of the compositions, the inks are subjected to litho break tests which involve running them on a Thwing-Albert litho break tester together with fountain solution and evaluating the resultant product by conventional techniques. The amount of water take-up is also determined by weighing the ink remaining on the rollers after the break test, both before and after being dried in an oven. In addition, the inks are run on a process to evaluate their actual lithographic efficiency.

While there are disclosed below but a limited number of embodiments of the invention herein presented it is possible to produce still other embodiments without departing from the inventive concept herein disclosed. It is desired, therefore, that only such limitations be imposed on the appended claims as are stated therein. Unless otherwise specified, all parts are given by weight.

EXMPLE 1

(A) In a 5-liter three-necked flask connected with a stirrer, a thermometer, and a condenser were placed 1420 ml. of dried benzene, 409 grams (3 moles) of pentaerythritol, 3 grams of cuprous oxide (as polymerization inhibitor), 46 grams of concentrated sulfuric acid (as catalyst), and 1296 grams (18 moles) of glacial acrylic acid with 1 percent of p-methoxyphenol (as inhibitor).

The mixture was heated at about 88° C. until 62.3 grams (3.46 moles) of water of esterification per mole of pentaerythritol was removed.

After cooling, the mixture was washed with 700 ml. of 20 percent NaCl solution, twice with 350 ml. of 24 percent KHCO₃ solution, and finally with 350 ml. of 20 percent NaCl solution. The benzene solution was filtered, 0.8 gram of p-methoxyphenol added, and the remaining solvent removed in vacuum using copper wire as an inhibitor.

The yield was 316 grams per mole of the pentaerythritol employed of a pale yellow liquid which, upon standing, solidified to a semi-solid melting at 48–49° C. and having a viscosity of 875 cps. Analysis showed 1.5 percent volatiles and an equivalent weight of 95.0, based on the saponification value.

The product was accordingly assigned the empirical formula

$$(HOH_2C)_{0.54}-C-(CH_2OOC-CH:CH_2)_{3.46}$$

indicating that it was a mixture of pentaerythritol triacrylate and pentaerythritol tetraacrylate in the ratio of 0.54:0.46 mole, having a hydroxyl equivalent of 607.

(B) 607 grams of the product of part (A) was placed in a dry, three-necked flask equipped with an agitator, a thermometer, a dropping funnel, and a gas inlet and outlet tube. At room temperature while agitating the charge and passing a small stream of dry air through the flask above the surface of the liquid, 72.6 grams (0.6 mole) of phenyl isocyanate was added slowly through the dropping funnel. After completion of the addition (about 1 hour), the reaction mass was allowed to stand for three hours and then discharged.

The product was a viscous, slightly yellow liquid having a viscosity of 2680 cps., as measured with a Brookfield Viscosimeter (#4 spindle at 60 r.p.m.). Infrared analysis (4.95 μscan) indicated the absence of the isocyanate peak and hence complete reaction. The product was a mixture of unmodified pentaerythritol triacrylate, unmodified pentaerythritol tetraacrylate, and pentaerythritol triacrylate-monophenyl carbamate having a hydroxyl number of 31.3.

(C) An ink was prepared by grinding the following ingredients on a three-roll mill:

| | Percent |
|---|---|
| 70/30 mixture of the product of part (B)/hexachlorobenzene | 85 |
| Benzidine yellow | 15 |

The ink was run on a Miehle press to print coated paper. The printed paper was exposed at a distance of 1¾ inches from three 20-inch 2100-watt Hanovia ultraviolet lamps. The ink dried in 0.8 second and had excellent gloss and water-resistance.

EXAMPLE 2

(A) 607 parts of pentaerythritol-3,4,6-acrylate, prepared by the process of part (A) of Example 1 and having a refractive index of $n_D^{25°}=1.4850$, was charged into a dry, three-necked flask equipped with an agitator, a thermometer, a dropping funnel, and gas inlet and outlet tube. While agitating at room temperature and passing a small stream of dry air through the flask above the surface of the liquid, 26 parts of tolylene-2,4-diisocyanate (0.15 mole) was slowly over a period of 30 minutes introduced through the dropping funnel. After the completion of the addition, the reaction mass was allowed to stand for several hours and then discharged.

The product was a viscous, slightly yellow liquid having a viscosity of 2460 cps., as measured at 25° C. with a Brookfield Viscosimeter (#4 spindle at 60 r.p.m.). Infrared analysis indicated the absence of the isocyanate peak and hence complete reaction after 20-hours reaction time. The material was a physical mixture of unchanged pentaerythritol triacrylate, unreacted pentaerythritol tetraacrylate, and the reaction product of pentaerythritol triacrylate with tolylene-2,4-diisocyanate, that is the compound of the formula

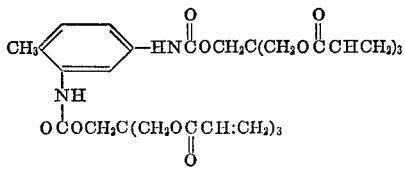

having a hydroxyl number of 60.7.

(B) The procedure of part (C) of Example 1 was repeated using a 70/30 mixture of the product of part (A) and a chlorinated paraffin (sold by Neville Chemical Co. as Unichlor-70B). The results were comparable.

EXAMPLE 3

The procedures of parts (A) and (B) of Example 2 were repeated using as the isocyanate an 80:20 mixture of tolylene-2,4-diisocyanate and tolylene-2,6-diisocyanate. The product was similar except for the added presence of the reaction product of pentaerythritol triacrylate with the tolylene-2,6-diisocyanate isomer. The resulting ink was comparable to that of part (C) of Example 1.

EXAMPLE 4

(A) 456 parts of dry benzene and 261 parts of 2,4-tolylene diisocyanate were charged into a dry, three-necked flask. While cooling and maintaining the temperature at 25–30° C., there was added over a period of 15 minutes 195 parts of dry 2-ethyl hexanol containing 1 part of dibutyl tin acetate. The liquid reaction mass was stirred at room temperature for several hours and then allowed to stand overnight.

The reaction mass, an almost colorless non-viscous liquid, was freed from the benzene solvent under vacuum, first at 125 torr and up to 70° C. and then at 20 torr and 80° C. The vacuum was released with nitrogen, and the reaction mass discharged. The yield was 459 parts of liquid 4,N,2-isocyanato-toluyl-β-ethyl hexyl carbamate having the formula

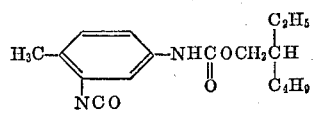

(B) 607 parts of pentaerythritol-3.46-acrylate, prepared by the process of part (A) of Example 1, and 0.5 part of dibutyl tin acetate were charged into a dry, three-necked flask equipped with an agitator, a thermometer, a dropping funnel, and a gas inlet and outlet tube. While agitating at 45° C. and passing a small stream of dry air through the flask above the surface of the liquid, 98.8 parts of 4,N,2-isocyanato-toluyl-β-ethyl hexyl carbamate prepared as in part (A) was charged at once through the dropping funnel. The liquid reaction mass was stirred at 45° C. for several hours, allowed to stand overnight, and then discharged.

The reaction product was a viscous, slightly yellow liquid having a viscosity of 4560 cps., as measured at 25° C. with a Brookfield Viscosimeter (#4 spindle at 60 r.p.m.). Infrared analysis of the product indicated the absence of the isocyanate absorption peak and, therefore, complete reaction at 20-hour reaction time. The material was a physical mixture of unchanged pentaerythritol triacrylate, unreacted pentaerythritol tetraacrylate, and the reaction product of pentaerythritol triacrylate with 4,N,2-isocyanato-toluyl-β-ethyl hexyl carbamate, that is, the compound having the formula

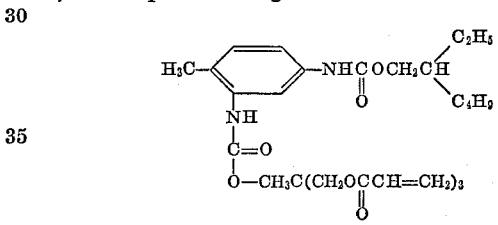

(C) The product of part (B) was formulated into an ink and run as in part (C) of Example 1. The results were comparable.

EXAMPLE 5

The procedures of parts (B) and (C) of Example 4 were repeated except that the carbamate was a 80/20 mixture of 4,N,2-isocyanato-toluyl-β-ethyl hexyl carbamate and 6,N,2-isocyanato-toluyl-β-ethyl hexyl carbamate. The results were comparable, except for the added presence of the reaction product of pentaerythritol triacrylate with the 6,N,2-isocyanato-toluyl-β-ethyl hexyl carbamate isomer.

EXAMPLE 6

A composition consisting of 70 parts of the product of part (B) of Example 1, 30 parts of benzophenone, and 0.1 part of dimethyl polysiloxane (to promote wetting) was applied in thicknesses ranging from 0.25 to 3.0 pounds per ream to each of the following substrates: book cover stock, clay-coated board, offset stock, can labels, and polyethylene board. The printed substrates were cured by exposure at the rate of 50 feet per minute at a distance of 1 inch from a 1200-watt Hanovia ultraviolet energy source.

The resulting products were superior in gloss properties, adhesion, and abrasion resistance to comparable products prepared in the same manner except with unmodified pentaerythritol triacrylate.

EXAMPLE 7

The composition of Example 6 was applied by a letterpress method at film weights ranging from 0.5 to 3.0 pounds per ream to each of these substrates: Saran-coated cellophane, polyethylene surface-treated with corana discharge, polyvinylidene dichloride-coated polypropylene, and Mylar. Laminations were made at 150° F.

and 50 pounds/inch pressure between cellophane and cellophane, cellophane and polypropylene, polypropylene and Mylar, and then cured by exposing them at the rate of 50 feet per minute at a distance of 1 inch from a 1200 watt Hanovia ultraviolet lamp. The laminations were successful as evidenced by tear seals having bond strengths of at least 300 grams per inch.

EXAMPLE 8

(A) A composition consisting of 70 parts of the product of part (B) of Example 1 and 30 parts of benzoin methyl ether cured to a tack-free dry film in 0.7–0.8 second when exposed at a distance of 1¾ inches to actinic radiation from a 2100-watt Hanovia ultraviolet lamp.

(B) Under the same conditions, a composition consisting of 70 parts of unmodified pentaerythritol-3.46-acrylate and 30 parts of benzoin methyl ether cured to a tack-free film in 1.0 to 1.2 seconds.

EXAMPLE 9

The procedure of part (C) of Example 1 was repeated using each of the following photoinitiators instead of hexachlorobenzene: benzoin ethyl ether, desyl amine, chlorinated rubber (sold by Hercules Inc. as Parlon S–5), a chlorinated aliphatic wax (sold by Diamond Alkali Co. as Chlorowax 70), chlorendic anhydride, benzoquinone, benzil, Michlers' Ketone, 2-t-butylanthraquinone, 9,10-phenanthrenequinone, 2-ethylanthraquinone, polybromobenzene, polybromoxylene, and a copolymer of vinyl chloride and vinyl isobutyl ether (sold by BASF Colors and Chemicals, Inc., as Vinoflex MP-400). The results were comparable.

EXAMPLE 10

(A) The procedure of part (B) of Example 1 was repeated except that the monomer was trimethylolpropane-2.53-acrylate instead of pentaerythritol-3.46-acrylate. The product had a hydroxyl number of 33.

(B) A mixture of 70 parts of the product of part (A) and 30 parts of benzoin ethyl ether dried to a tack-free film in less than 1.5 seconds when exposed at a distance of 1¾ inches to an actinic energy source of 2100 watts.

(C) Mixtures of 70 parts of each of the reaction products of the following trimethylolpropane acrylates and an isocyanate and 30 parts of a mixture of biphenyls and triphenyls containing 65 percent of chlorine were exposed on glass substrates at a distance of 1¾ inches from a 100-watt/inch ultraviolet lamp. The cure speeds of the films are given below:

TABLE I

| Ester (moles of acrylate per mole of product) | Isocyanate type (equivalents, NCO/OH ratio) | Cure speed, seconds |
| --- | --- | --- |
| Trimethylolpropane acrylate (2.06) | Phenyl isocyanate (1.0:1.7) | 9.0 |
| Trimethylolpropane acrylate (2.53) | do | 8.5 |
| Trimethylolpropane acrylate (2.06) | 2,4-toluene diisocyanate (1.0:2.0) | 2.8 |
| Trimethylolpropane acrylate (2.53) | do | 5.6 |

EXAMPLE 11

The procedures of parts (A) and (B) of Example 10 were repeated except that each of the following monomeric materials was used instead of trimethylolpropane-2.53-acrylate: trimethylolethane - 2.53 - acrylate, trimethylolpropane - 2.06 - methacrylate, pentaerythritol trimethacrylate, pentaerythritol diitaconate, and a mixture of dimers and trimers of pentaerythritol triacrylate. The results were comparable.

EXAMPLE 12

(A) The procedure of part (B) of Example 1 was repeated with pentaerythritol acrylates having ester ranks other than 3.46. By "ester rank" is meant the degree of esterification, that is, the average number of ester groups per molecule. The viscosities of the resulting carbamates are tabulated below.

(B) The products of part (A) were cured by exposing them on glass substrates at a distance of 1¾ inches from a 2100-watt/inch ultraviolet lamp. The cure speeds are tabulated below.

TABLE II

| Ester rank of pentaerythritol | Viscosity, cps. | Cure speed, second |
| --- | --- | --- |
| 3.82 | 1,030 | 0.9 |
| 3.75 | 1,400 | 0.9 |
| 3.55 | 3,440 | 0.9 |
| 3.37 | 5,440 | 0.9 |
| 3.21 | 7,900 | 0.8 |
| 3.01 | 20,000 | 0.6 |
| 2.68 | >10$^5$ | Tacky |

EXAMPLE 13

(A) The procedure of part (B) of Example 1 was repeated except that each of the following isocyanates was used instead of phenyl isocyanate. The viscosity of each carbamate product is tabulated below.

(B) The products of part (A) were cured by exposing them on glass substrates at a distance of 1¾ inches from a 2100-watt/inch ultraviolet lamp. The cure speeds are tabulated below.

TABLE III

| Isocyanate | NCO/OH ratio | Viscosity, cps. | Cure speed, seconds |
| --- | --- | --- | --- |
| Toluene diisocyanate | 0.2 | 2,000 | 1.1 |
| Do | 0.4 | 4,610 | 0.7 |
| Do | 0.6 | 12,600 | 0.5 |
| o-Tolyl isocyanate | 0.6 | 3,580 | 0.7 |
| p-Chlorophenyl isocyanate | 0.6 | 5,730 | 0.8 |
| Cyclohexyl isocyanate | 0.6* | 3,100 | 0.8 |
| Allyl isocyanate | 0.6 | 1,300 | 0.97 |
| Methyl isocyanate | 0.56* | 1,700 | 0.6 |

* Plus 0.2% stannous octoate as catalyst.

EXAMPLE 14

The procedure of part (C) of Example 1 was repeated except that each of the following proportions of ester to photoinitiator was used instead of 70/30: 99/1, 90/10, 80/20, 50/50, 20/80, and 10/90. The results were comparable.

EXAMPLE 15

The procedure of part (C) of Example 1 was repeated with each of the following colorants instead of benzidine yellow: lithol rubine red, phthalocyanine blue, carbon black, milori blue, and phthalocyanine green. The results were comparable.

EXAMPLE 16

To demonstrate the relationship between hydrophilicity of monomeric esters and their suitability as vehicles for lithographic inks, the following runs (shown in Table IV) were made on pentaerythritol acrylates ranging in ester rank from 2.5 to 4, both unmodified and modified with varying amounts of phenyl isocyanate. Hydrophilicity was measured by a test which determines the water tolerance of a material by titrating a solution of the material in a mixture of ethanol and acetone with water to a cloud end point, i.e., a solution opacity through which 3-point type printed matter becomes illegible.

The results are reported as the volume of water (ml.) used to titrate the sample. A water tolerance value of about 10±2 is considered satisfactory for lithographic applications, and 10–11 is preferred.

TABLE IV

| Pentaerythritol acrylates | | Modified pentaerythritol acrylates | | |
|---|---|---|---|---|
| Ester rank | Water tolerance, ml. | Phenyl isocyanate | Water tolerance, ml. | Press characteristic |
| 2.5 | 24.2 | 0 | | (*). |
| 2.5 | | 17.5 | 12.9 | Some tinting.* |
| 2.5 | | 22.5 | 10.7 | Excellent. |
| 2.5 | | 38.0 | 7.1 | Stripping.* |
| 2.7 | 22.1 | 0 | | (*). |
| 2.7 | | 17.5 | 12.2 | Sl. tinting.* |
| 2.7 | | 19.5 | 10.9 | Excellent. |
| 2.7 | | 33.0 | 6.1 | Stripping. |
| 2.9 | 21.2 | 0 | | (*). |
| 2.9 | | 17.5 | 11.4 | Good. |
| 2.9 | | 18.0 | 11.0 | Excellent. |
| 2.9 | | 25.0 | 6.4 | Stripping. |
| 3.1 | 16.7 | 0 | | (*). |
| 3.1 | | 10.0 | 11.9 | Sl. tinting. |
| 3.1 | | 14.0 | 10.5 | Excellent. |
| 3.1 | | 17.5 | 8.6 | Stripping. |
| 3.3 | 15.5 | 0 | | (*). |
| 3.3 | | 10.0 | 12.3 | Sl. tinting. |
| 3.3 | | 13.0 | 11.2 | Excellent. |
| 3.3 | | 17.5 | 8.3 | Stripping. |
| 3.5 | 14.5 | 0 | | (*). |
| 3.5 | | 11.0 | 10.2 | Excellent. |
| 3.5 | | 15.0 | 8.8 | Sl. stripping. |
| 3.7 | 14.0 | 0 | | (*). |
| 3.7 | | 9.0 | 10.3 | Excellent. |
| 3.9 | 13.5 | 0 | | (*). |
| 3.9 | | 2.8 | 12.3 | Sl. tinting. |
| 4.0 [1] | 13.5 | 0 | | (*). |

[1] Recrystallized.
*=not acceptable as lithographic printing ink vehicle due to severe scumming, tinting, or blanket contamination; tinting=emulsified ink appears in non-print areas; stripping=ink does not pick up sufficient water.

These data show that compounds having a water tolerance between about 8.8 and 12.3 are good lithographic printing ink vehicles. These suitable water tolerance values are obtained when pentaerythritol acrylates are modified with phenyl isocyanate in varying amounts, as shown in Table V.

TABLE V

| Pentaerythritol acrylates, ester rank | Phenyl isocyanate percent, based on weight of the acrylate |
|---|---|
| 2.5 | 10-25 |
| 2.7 | 10-20 |
| 2.9 | 9-19 |
| 3.1 | 8-17 |
| 3.3 | 8-16 |
| 3.5 | 7-15 |
| 3.7 | 6-14 |
| 3.9 | 5-13 |

EXAMPLE 17

To show the reduction in toxicity effected by the isocyanate-modification of monomeric esters, both the acute oral toxicity and the dermal irritation of pentaerythritol-3.3-acrylate and pentaerythritol-3.3-acrylate modified with 11 percent of phenyl isocyanate with and without a photoinitiator were determined by Food & Drug Research Laboratories, Inc., test methods and compared with the acute oral toxicity of aspirin. The results are tabulated below:

TABLE VI

| | Acute oral toxicity, LD$_{50}$ (g./kg.) | Dermal irritation (Draise score system) |
|---|---|---|
| (1) Phenyl isocynate-modified pentaerythritol acrylate | 2.9 | [1] 4.0 |
| (2) 70/30 mixture of phenyl isocyanate-modified pentaerythritol acrylate/benzoin methyl ether | 4.5 | [1] 4.8 |
| (3) Pentaerythritol acrylate (unmodified) | 1.8 | 7.4 |
| (4) Acetylsalicylic acid (aspirin) | 1.75 | |

[1] Moderate edema.
[2] Edema.

It can be seen from the above data that the isocyanate-modified pentaerythritol-3.3-acrylate, both with (2) and without (1) a photoinitiator, exhibits less acute oral toxicity than either unmodified pentaerythritol-3.3-acrylate (3) or aspirin (4). In addition, the dermal irritation caused by the modified ester, both with and without a photoinitiator, is substantially less than the dermal irritation caused by the unmodified ester.

EXAMPLE 18

To demonstrate the importance of using a polyethylenically unsaturated ester for the end uses for which the compositions of this invention are best suited, the procedures of parts (B) and (C) of Example 1 were repeated with each of the following monoethylenically unsaturated monomeric esters instead of pentaerythritol-3.46-acrylate: hydroxyethyl acrylate, hydroxyethyl methacrylate, and hydroxyhexyl acrylate. In each of these cases where the starting ester was monoethylenically unsaturated the isocyanate-modified product was not acceptable because the speed of curing was too slow, the solution viscosity was too high, and the surface properties were poor.

EXAMPLE 19

In order to show the need for the presence of unreacted hydroxy groups in the product, the procedures of parts (B) and (C) of Example 1 were repeated except that instead of the pentaerythritol-3.46-acrylate, the starting monomeric ester was trimethylolpropane - 2.5 - methacrylate. The trimethylolpropane-2.5-methacrylate was reacted with sufficient phenyl isocyanate to convert all of the hydroxyl groups to carbamate groups. The isocyanate-modified product was not acceptable as a lithographic ink vehicle because of stripping.

EXAMPLE 20

The procedures of Examples 1–15 were repeated except that instead of being exposed to ultraviolet light the samples were passed on a conveyor belt beneath the beam of a Dynacote 300,000-volt linear electron accelerator at a speed and beam current so regulated as to produce a dose rate of 0.5 megarad.

These systems produced resinous materials of varying degrees of hardness in films from 0.5 to 20 mils thick having tacky surfaces.

EXAMPLE 21

The procedures of Examples 1–15 were repeated except that instead of being exposed to ultraviolet light the samples were exposed to a combination of ultraviolet light and and electron beam radiation in a variety of arrangements: ultraviolet light, then electron beam; electron beam; then ultraviolet light; ultraviolet light before and after electron beam; and electron beam before and after ultraviolet radiation. The results were comparable.

What is claimed is:

1. A radiation-curable composition which consists essentially of (1) about 10 to 99 weight percent of at least one product of the reaction of (a) a polyfunctional polyethylenically unsaturated monomeric ester having free hydroxyl groups and formed by the reaction of an ethylenically unsaturated acid and a polyhydric alcohol with (b) an organic isocyanate, the isocyanate-modified ester product (1) having a hydroxyl number of about 15 to 70, and (2) about 1 to 90 weight percent of at least one photoinitiator.

2. The composition of claim 1 wherein the hydroxyl number of the isocyanate-modified ester product is about 25 to 60.

3. The composition of claim 1 wherein the ratio of the isocyanate-modified ester product to the photoinitiator is about 70 to 98:2 to 30.

4. The composition of claim 1 wherein the ester (a) is a di- or polyacrylate, a di- or polymethacrylate, or a di- or polyitaconate.

5. The composition of claim 1 wherein the polyhydric alcohol is pentaerythritol.

6. The composition of claim 1 wherein the polyhydric alcohol is trimethylolpropane.

7. The composition of claim 1 wherein the polyhydric alcohol is trimethylolethane.

8. The composition of claim 1 wherein the ester (a) is a pentaerythritol acrylate having an average of about 2.5 to 3.0 ester groups per molecule.

9. The composition of claim 1 wherein the isocyanate is phenyl isocyanate.

10. The composition of claim 1 wherein the isocyanate is tolylene diisocyanate.

References Cited

UNITED STATES PATENTS

| | | | |
|---|---|---|---|
| 3,425,988 | 2/1969 | Gorman et al. | 260—47 |
| 3,297,745 | 1/1967 | Fekete et al. | 260—47 |
| 3,495,987 | 2/1970 | Moore | 96—115 |
| 3,509,234 | 4/1970 | Burlant et al. | 204—159.15 |
| 3,664,861 | 5/1972 | Okamura et al. | 204—159.19 |

JOHN C. BLEUTGE, Primary Examiner

R. B. TURER, Assistant Examiner

U.S. Cl. X.R.

117—132 R, 138.8 R, 138.8 B, 138.8 E, 148, 155 UA, 152 R, 161 R, 116 UT; 161—216, 249; 204—159.15, 159.22, 159.24; 260—18 TN, 28.5 R, 31.2 N, 41 R, 41 B, 41 C

UNITED STATES PATENT OFFICE
CERTIFICATE OF CORRECTION

Patent No. 3,759,809              Dated September 18, 1973

Inventor(s) Daniel J. Carlick et al.

It is certified that error appears in the above-identified patent and that said Letters Patent are hereby corrected as shown below:

Column 6, line 16, change "process" to -- press --; line 25, change "EXMPLE" to -- EXAMPLE --.

Column 7, line 14, change "3,4,6" to -- 3.46 --.

Column 8, line 38, change " | " to -- | --.
                              $O-CH_3$        $O-CH_2$ Column 11, line 72, insert a superscript 2 before "7.4".

Column 12, line 54, delete the first "and"; line 56, after "beam" change ";" to -- , --.

Claim 8, line 3, change "3.0" to -- 3.9 --.

Signed and sealed this 18th day of December 1973.

(SEAL)
Attest:

EDWARD M. FLETCHER, JR.            RENE D. TEGTMEYER
Attesting Officer                   Acting Commissioner of Patents